United States Patent
Minami et al.

(10) Patent No.: US 12,253,637 B2
(45) Date of Patent: Mar. 18, 2025

(54) SCINTILLATOR PANEL AND RADIATION DETECTOR

(71) Applicant: HAMAMATSU PHOTONICS K.K., Hamamatsu (JP)

(72) Inventors: Yusuke Minami, Hamamatsu (JP); Hirotake Osawa, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 190 days.

(21) Appl. No.: 17/925,898

(22) PCT Filed: Feb. 26, 2021

(86) PCT No.: PCT/JP2021/007443
§ 371 (c)(1),
(2) Date: Nov. 17, 2022

(87) PCT Pub. No.: WO2021/256011
PCT Pub. Date: Dec. 23, 2021

(65) Prior Publication Data
US 2023/0184967 A1    Jun. 15, 2023

(30) Foreign Application Priority Data

Jun. 16, 2020 (JP) .................. 2020-103949

(51) Int. Cl.
*G01T 1/202* (2006.01)
*C09K 11/77* (2006.01)
*G01T 1/20* (2006.01)

(52) U.S. Cl.
CPC .......... *G01T 1/2023* (2013.01); *C09K 11/772* (2013.01); *G01T 1/2002* (2013.01); *G01T 1/20185* (2020.05)

(58) Field of Classification Search
CPC .. G01T 1/2023; G01T 1/20185; C09K 11/772
See application file for complete search history.

(56) References Cited

U.S. PATENT DOCUMENTS

| | | | | |
|---|---|---|---|---|
| 4,297,584 A | * | 10/1981 | Buchanan | .......... C09K 11/7767 250/483.1 |
| 5,391,876 A | * | 2/1995 | Tsoukala | ............... G01T 1/2985 250/361 R |
| 2001/0045522 A1 | | 11/2001 | Homme et al. | |

(Continued)

FOREIGN PATENT DOCUMENTS

| JP | 2006-020820 A | 1/2006 |
|---|---|---|
| JP | 2011-022068 A | 2/2011 |

(Continued)

OTHER PUBLICATIONS

International Preliminary Report on Patentability mailed Dec. 29, 2022 for PCT/JP2021/007443.

*Primary Examiner* — Hugh Maupin
(74) *Attorney, Agent, or Firm* — Faegre Drinker Biddle & Reath LLP (57) ABSTRACT

Provided is a scintillator panel including: a support; a scintillator layer provided on the support, the scintillator layer being composed of a columnar crystal; and a protective film covering at least the scintillator layer. The scintillator layer contains cesium iodide as a base material and cerium as an activator.

11 Claims, 9 Drawing Sheets

(56) References Cited

U.S. PATENT DOCUMENTS

| | | | |
|---|---|---|---|
| 2007/0114447 A1* | 5/2007 | Shoji | C09K 11/7771 |
| | | | 250/483.1 |
| 2010/0243908 A1 | 9/2010 | Shoji et al. | |
| 2012/0012787 A1* | 1/2012 | LaCourse | C04B 35/632 |
| | | | 252/301.4 R |
| 2016/0116606 A1* | 4/2016 | Itaya | G01T 1/2023 |
| | | | 250/366 |
| 2016/0282479 A1* | 9/2016 | Tanino | G21K 4/00 |
| 2017/0192105 A1* | 7/2017 | Hamano | G01T 1/20 |
| 2018/0172850 A1* | 6/2018 | Kim | C30B 29/12 |
| 2019/0250286 A1 | 8/2019 | Wu et al. | |
| 2020/0081140 A1* | 3/2020 | Ojima | G01T 1/202 |

FOREIGN PATENT DOCUMENTS

| | | |
|---|---|---|
| JP | 2016-042671 A | 3/2016 |
| WO | WO-2009/031574 A1 | 3/2009 |
| WO | WO-2013/089015 A1 | 6/2013 |
| WO | WO-2016/063357 A1 | 4/2016 |

* cited by examiner

SCINTILLATOR PANEL AND RADIATION DETECTOR

TECHNICAL FIELD

One aspect of the present invention relates to a scintillator panel and a radiation detector, and particularly to a scintillator panel and a radiation detector used for imaging an irradiation target using X-rays or gamma rays.

BACKGROUND ART

Patent Literature 1 describes a radiation detector including a photoelectric conversion substrate in which photodiodes are arranged and a phosphor layer (a scintillator layer) formed on the photoelectric conversion substrate. In the radiation detector described in Patent Literature 1, the scintillator layer contains cesium iodide as a base material and thallium as an activator.

CITATION LIST

Patent Literature

[Patent Literature 1] Japanese Unexamined Patent Publication No. 2006-20820

SUMMARY OF INVENTION

Technical Problem

In the above-mentioned technique, an emission lifetime is about 1000 ns, and it is difficult to obtain a faster emission lifetime, and thus it may be difficult to obtain excellent high speed responsiveness.

One aspect of the present invention is to provide a scintillator panel and a radiation detector in which excellent high speed responsiveness can be obtained.

Solution to Problem

As a result of diligent studies, the present inventors have obtained the finding that an emission lifetime can be made faster by including cesium iodide as a base material and cerium as an activator in a scintillator layer, and have completed the present invention. That is, a scintillator panel according to one aspect of the present invention includes a support, a scintillator layer that is formed on the support and is composed of a columnar crystal, and a protective film covering at least the scintillator layer, wherein the scintillator layer contains cesium iodide as a base material and cerium as an activator.

In this scintillator panel, the scintillator layer contains cesium iodide as a base material and cerium as an activator. In this way, by forming the scintillator layer on the basis of the above finding, a fast emission lifetime can be obtained, and as a result, excellent high speed responsiveness can be obtained.

In the scintillator panel according to one aspect of the present invention, a concentration of the cerium may be 300 to 6000 ppm. In this case, scintillation light with high luminance can be obtained.

In the scintillator panel according to one aspect of the present invention, an emission wavelength characteristic of the scintillator layer may have a first emission peak at a first emission wavelength, and a second emission peak at a second emission wavelength on a longer wavelength side than the first emission wavelength, and the first emission peak may be larger than the second emission peak. In this case, scintillation light with high light intensity can be obtained.

In the scintillator panel according to one aspect of the present invention, the protective film may include a first organic film, an inorganic film, and a second organic film. Thus, deterioration of characteristics due to deliquescence of the scintillator layer can be inhibited more reliably.

In the scintillator panel according to one aspect of the present invention, the inorganic film may have a laminated structure. In this case, deterioration of characteristics due to deliquescence of the scintillator layer can be inhibited more reliably.

In the scintillator panel according to one aspect of the present invention, the support may be a substrate made of at least one of aluminum, glass, amorphous carbon, and polyethylene terephthalate resin, or a fiber optic plate. By adopting such a support, the scintillator panel can be specifically configured.

A radiation detector according to one aspect of the present invention includes the scintillator panel, and a sensor panel that is joined to the scintillator panel and includes a photoelectric conversion element. Since this radiation detector also includes the scintillator panel, it has an effect that excellent high speed responsiveness can be obtained.

A radiation detector according to one aspect of the present invention includes a sensor panel including a photoelectric conversion element, a scintillator layer that is formed on the sensor panel and is composed of a columnar crystal, and a protective film covering at least the scintillator layer, wherein the scintillator layer contains cesium iodide as a base material and cerium as an activator.

Also in this radiation detector, by forming the scintillator layer on the basis of the above finding, a fast emission lifetime can be obtained, and excellent high speed responsiveness can be obtained.

In the radiation detector according to one aspect of the present invention, a concentration of the cerium may be 300 to 6000 ppm. In this case, light emission with high luminance can be obtained.

In the radiation detector according to one aspect of the present invention, an emission wavelength characteristic of the scintillator layer may have a first emission peak at a first emission wavelength, and a second emission peak at a second emission wavelength on a longer wavelength side than the first emission wavelength, and the first emission peak may be larger than the second emission peak. In this case, scintillation light with high light intensity can be obtained.

In the radiation detector according to one aspect of the present invention, the protective film may include a first organic film, an inorganic film, and a second organic film. Thus, deterioration of characteristics due to deliquescence of the scintillator layer can be inhibited reliably.

In the radiation detector according to one aspect of the present invention, the inorganic film may have a laminated structure. In this case, deterioration of characteristics due to deliquescence of the scintillator layer can be inhibited more reliably.

The radiation detector according to one aspect of the present invention may be a photon counting type detector. In a case in which the radiation detector is a photon counting type detector, the above effect of obtaining excellent high speed responsiveness is particularly effective.

Advantageous Effects of Invention

According to one aspect of the present invention, it is possible to provide a scintillator panel and a radiation detector in which excellent high speed responsiveness can be obtained.

DESCRIPTION OF EMBODIMENTS

Embodiments will be described in detail below with reference to the drawings. In the description of each figure, the same elements or corresponding elements may be denoted by the same reference signs, and repeated description thereof may be omitted.

First Embodiment

Figure 1:
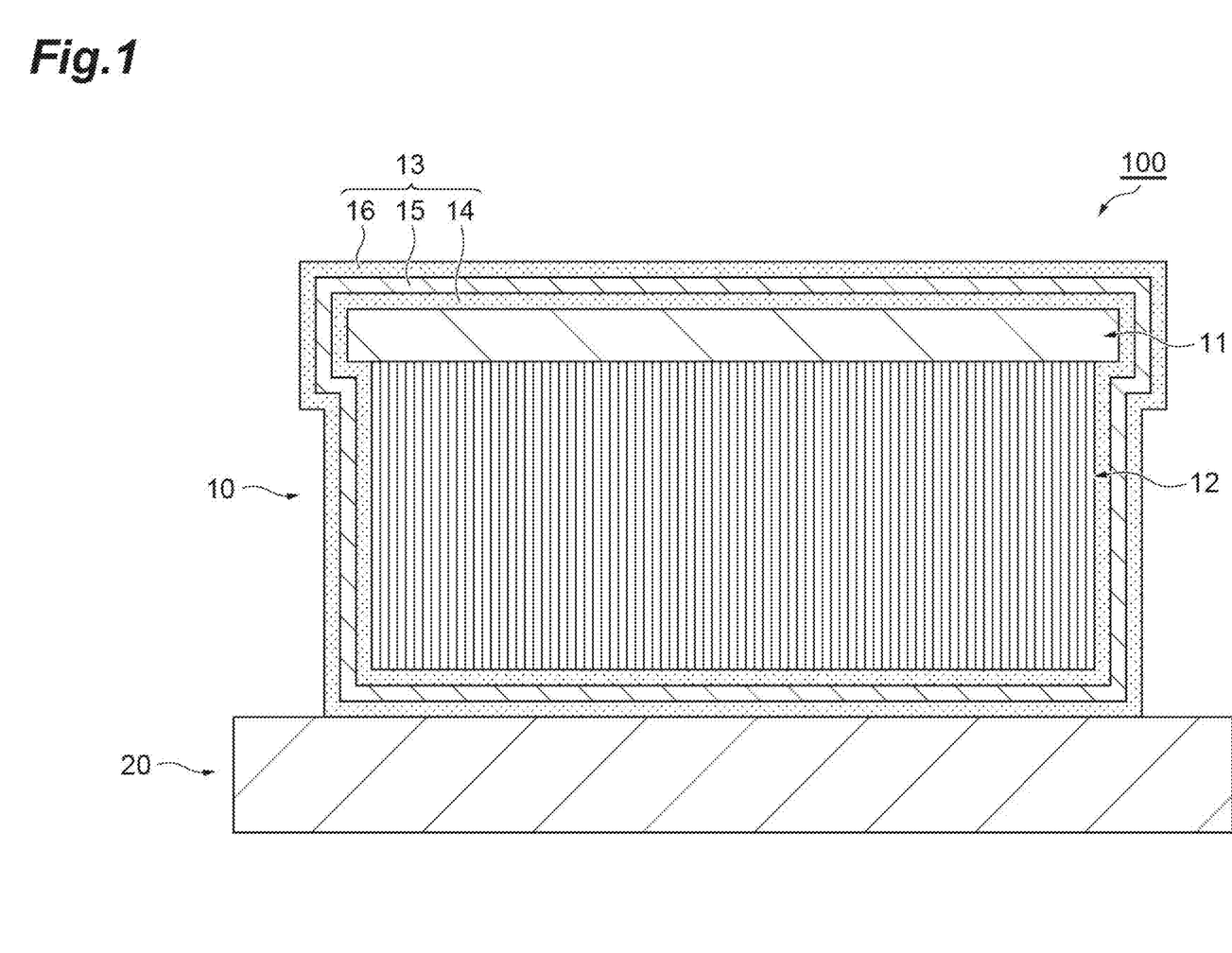
FIG. 1 is a diagram schematically showing a cross-section of a radiation detector according to a first embodiment.

As shown in FIG. 1, a radiation detector 100 according to a first embodiment is a photon counting type detector. That is, the radiation detector 100 is not a detector using an energy integral type collection method (a current mode measurement method), but a detector using a photon counting method. The radiation detector 100 is used for imaging an irradiation target using, for example, X-rays or gamma rays. The radiation detector 100 includes a scintillator panel 10 and a sensor panel 20.

The scintillator panel 10 includes a support 11, a scintillator layer 12, and a protective film 13. The support 11 is a substrate made of at least one of aluminum, glass, amorphous carbon, and polyethylene terephthalate resin.

The scintillator layer 12 is formed on the support 11. The scintillator layer 12 produces (emits) scintillation light in response to incidence of radiation. The scintillator layer 12 of the present embodiment is a high speed scintillator having high speed responsiveness that produces scintillation light having a fast emission lifetime. For example, the scintillator layer 12 produces scintillation light having a fast emission lifetime of about 100 ns or less, as will be described later. The emission lifetime is also referred to as a fluorescence lifetime or an emission time constant. The emission lifetime is, for example, a time until an intensity of generated scintillation light reaches about 36.8% of an initial emission peak.

Figure 2:
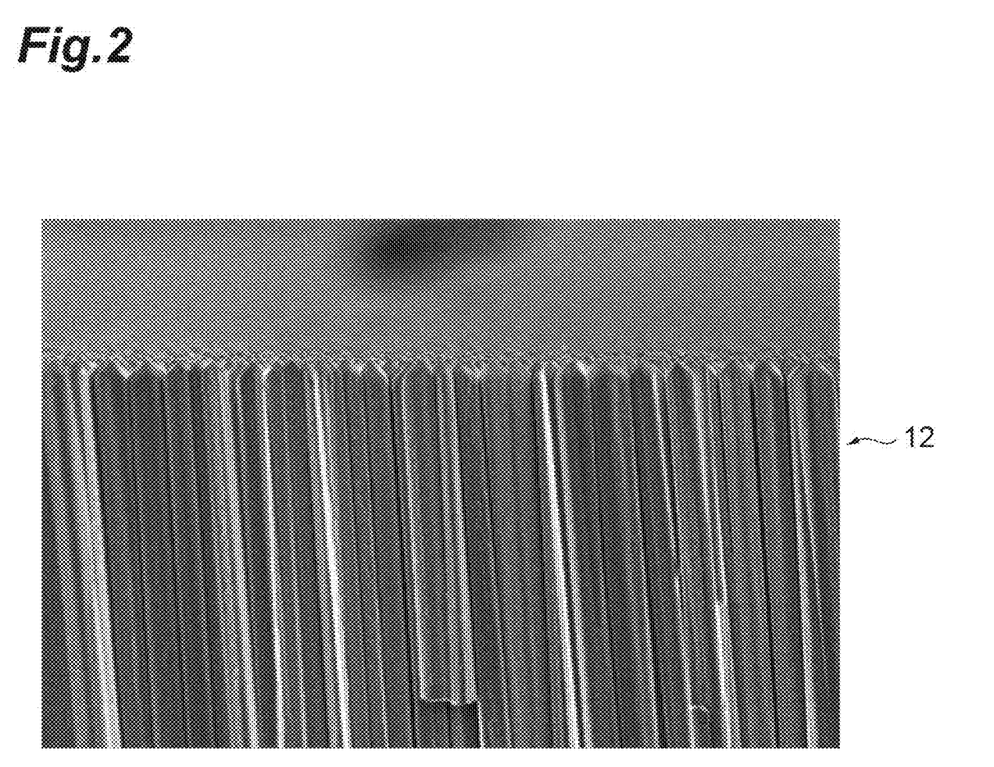
FIG. 2 is a diagram showing an SEM image of a cross-section of a scintillator layer.

The scintillator layer 12 is composed of a plurality of columnar crystals (see FIG. 2). The columnar crystals of the scintillator layer 12 are arranged with their root sides on the support 11 side. The scintillator layer 12 contains cesium iodide (CsI) as a base material and cerium (Ce) as an activator. The scintillator layer 12 here is produced using a vacuum vapor deposition method in which cesium iodide is used as a base material and cerium iodide ($CeI_3$) as a dopant. Light emission of the scintillator layer 12 is caused by cerium. Cerium chloride or cerium bromide may be used instead of cerium iodide.

A concentration of the cerium in the scintillator layer 12 is 300 to 6000 ppm. A concentration of the cerium in the scintillator layer 12 is 500 to 5000 ppm. That is, a concentration of the cerium may be 300 ppm or more, 500 ppm or more, 5000 ppm or less, 6000 ppm or less, or at least any combination of these.

An emission wavelength characteristic of the scintillator layer 12 has a plurality of emission peaks. Specifically, the emission wavelength characteristic of the scintillator layer 12 has a first emission peak at a first emission wavelength, and a second emission peak at a second emission wavelength on a longer wavelength side than the first emission wavelength. The first emission peak is larger than the second emission peak. For example, in the scintillator layer 12, a wavelength region having emission peaks is 400 to 600 nm, the first emission wavelength is present between 430 and 470 nm, and the second emission wavelength is present between 470 and 510 nm. In other words, the emission peak is present in the wavelength region of 400 to 600 nm, the first emission peak is present in the range of 430 to 470 nm, and the second emission peak is present in the range of 470 to 510 nm.

The protective film 13 is a film covering at least the scintillator layer 12. The protective film 13 includes a first organic film 14, an inorganic film 15, and a second organic film 16. The first organic film 14 is a protective layer that protects the entire support 11 and scintillator layer 12. The first organic film 14 is formed to cover the support 11 and the scintillator layer 12. For the first organic film 14, for example, polyparaxylylene is used. The inorganic film 15 is a protective layer provided for the purpose of improving humidity resistance. The inorganic film 15 is formed to cover the first organic film 14. The inorganic film 15 has a laminated structure. The inorganic film 15 is formed by laminating a film of aluminum, titanium, or an oxide thereof. For example, the inorganic film 15 includes an aluminum oxide film and a titanium oxide film.

The second organic film 16 is a protective layer that protects the entire scintillator panel 10. The second organic film 16 is formed to cover the inorganic film 15. For example, polyparaxylylene is used for the second organic film 16. A thickness of the inorganic film 15 is smaller than that of the first organic film 14 and the second organic film 16 and is 30 nm, for example. Thicknesses of the first organic film 14 and the second organic film 16 are equal to each other and are 10 μm, for example. The scintillator panel 10 configured as described above may be annealed to remove internal strain (residual stress).

The sensor panel 20 is joined to the scintillator panel 10. The sensor panel 20 is joined to tip sides of the columnar crystals of the scintillator layer 12 in the scintillator panel 10. The sensor panel 20 has a photoelectric conversion element. The sensor panel 20 detects light emission (scintillation light) of the scintillator layer 12. For the sensor panel 20, for example, a multi-pixel photon counter (MPPC, manufactured by Hamamatsu Photonics Co., Ltd., registered trademark) can be used.

Figure 3:
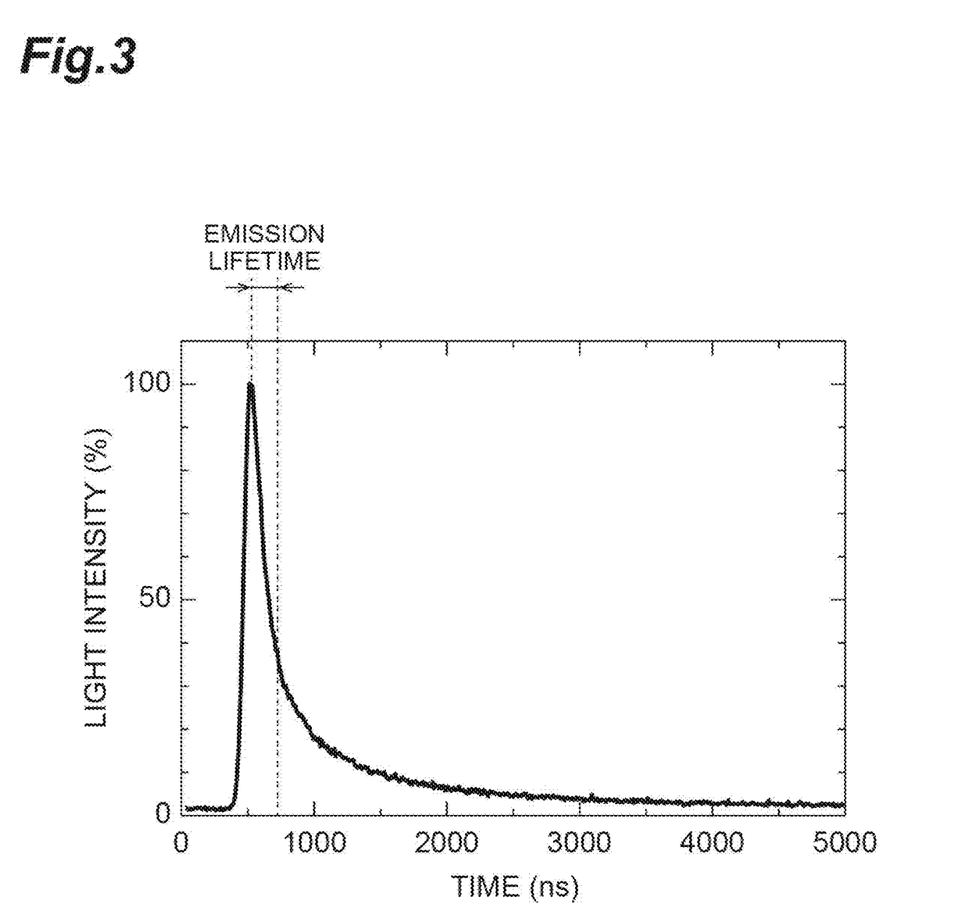
FIG. 3 is a graph showing an emission lifetime characteristic of the scintillator layer.

FIG. 3 is a graph showing an emission lifetime characteristic of the scintillator layer 12. In FIG. 3, the vertical axis is a light intensity (%) of the scintillation light, and the horizontal axis is a time (ns). The light intensity here is expressed as a relative value with respect to an emission peak time. As shown in FIG. 3, it can be seen that the scintillator layer 12 has an emission lifetime of about 100 ns and may generate scintillation light having a very fast emission lifetime. The scintillator layer 12 has an emission lifetime of about 1/10 of that of a general scintillator layer that contains cesium iodide as a base material and thallium as an activator.

Figure 4:
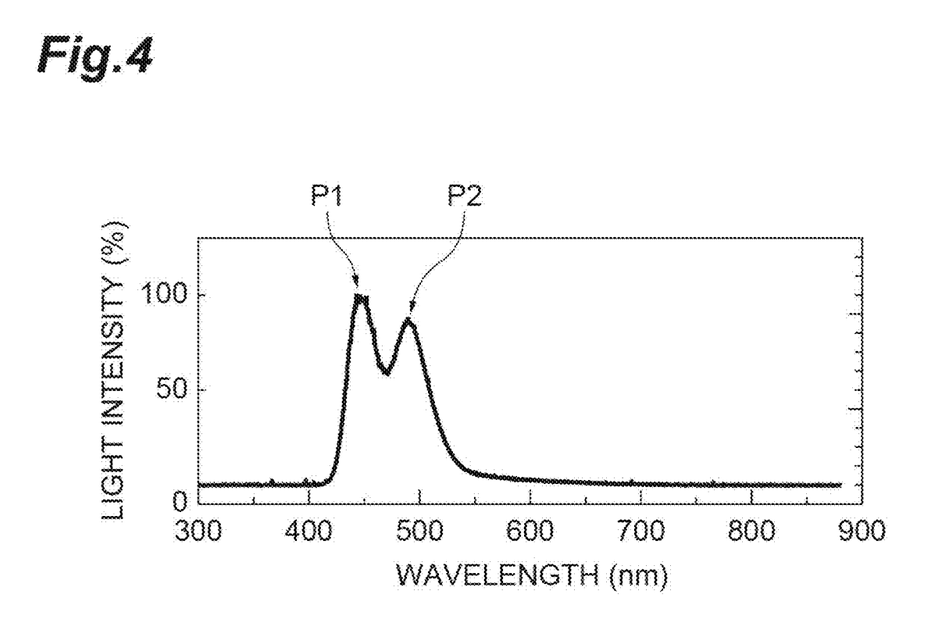
FIG. 4 is a graph showing an emission wavelength characteristic of the scintillator layer.

FIG. 4 is a graph showing an emission wavelength characteristic of the scintillator layer 12. In FIG. 4, the vertical axis is a light intensity (%) of the scintillation light, and the horizontal axis is a wavelength (nm) of the scintillation light. The light intensity here is expressed as a relative value with respect to the maximum value thereof. As shown in FIG. 4, the emission wavelength characteristic (an emission spectrum) of the scintillator layer 12 has a first emission peak P1 at a first emission wavelength on a shorter wavelength side, and a second emission peak P2 at a second emission wavelength on a longer wavelength side. The first emission peak P1 has a higher light intensity than the second emission peak. In the scintillator layer 12, emission wavelengths including emission peak wavelengths are 400 to 600 nm, the first emission wavelength is 430 to 470 nm (in the illustrated example, 440 nm), and the second emission wavelength is 470 to 510 nm (in the illustrated example, 490 nm).

Figure 5:
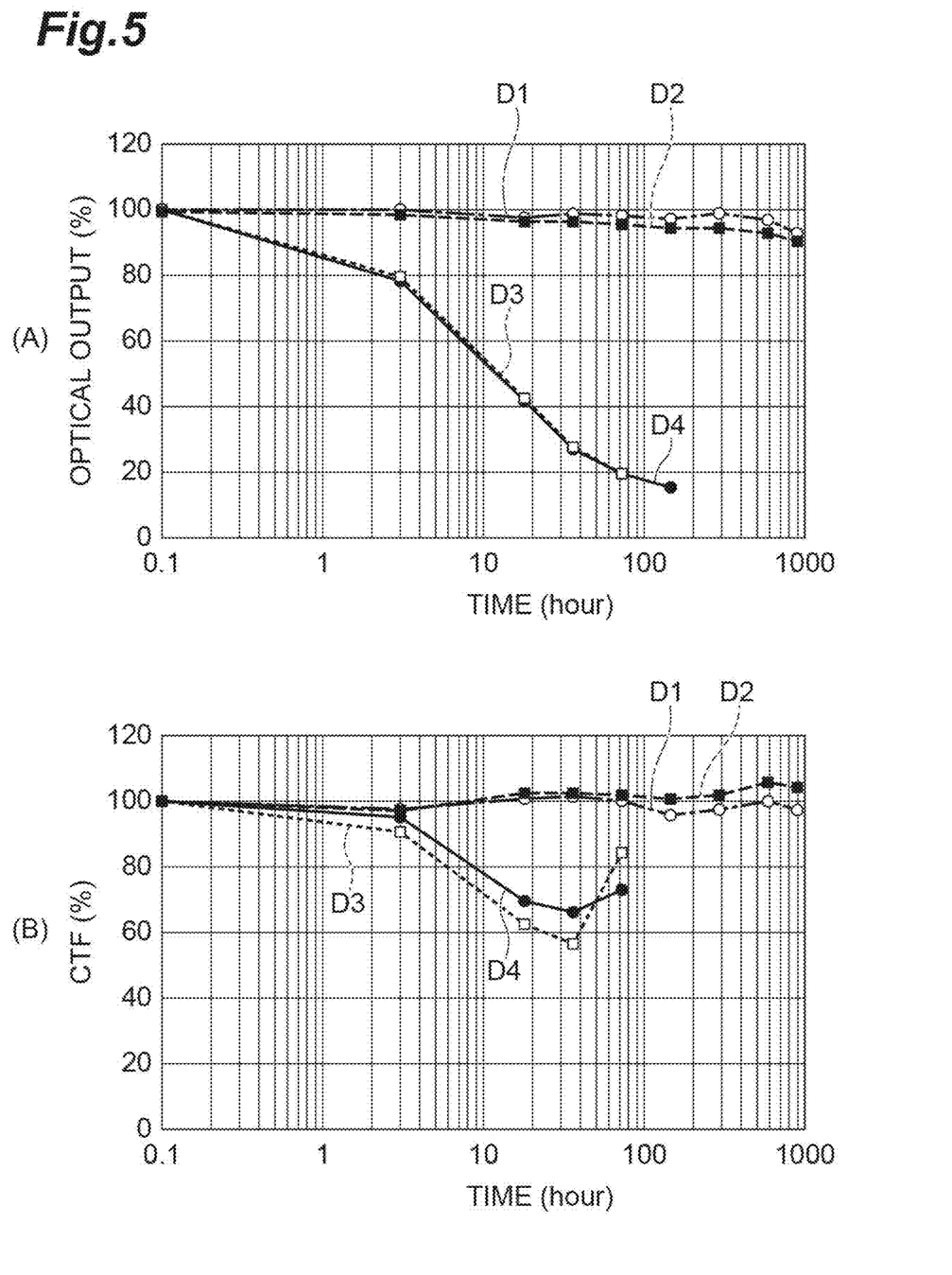
FIG. 5(A) is a graph showing results of a high temperature and high humidity test of a scintillator panel.
FIG. 5(B) is a graph showing other results of the high temperature and high humidity test of the scintillator panel.

FIGS. 5(A) and 5(B) are graphs showing results of a high temperature and high humidity test of the scintillator panel 10. In FIG. 5(A), the vertical axis is an optical output (%) of the scintillator panel 10, and the horizontal axis is a time (hour). In FIG. 5(B), the vertical axis is a contrast transfer function (CTF) (%) of the scintillator panel 10, and the horizontal axis is a time (hour). The optical output and the contrast transfer function here are expressed as relative values with respect to values at the start of the test. In FIGS. 5(A) and 5(B), D1 and D2 are results according to examples, and D3 and D4 are results according to comparative examples.

The examples are the scintillator panels 10. The comparative examples are different from the examples in that they include a protective film having a single-layer structure configured only by an organic film made of polyparaxylylene, instead of the protective film 13 having a laminated structure. The high temperature and high humidity test is, for example, an environmental test at a temperature of 40° C. and a humidity of 90% (40° C. 90% RH environmental test), and is performed in accordance with known test conditions such as JIS. As shown in FIGS. 5(A) and 5(B), in the comparative examples, due to deliquescence of the scintillator layer 12, the characteristics deteriorate with the passage of time. On the other hand, in the examples, deterioration of the characteristics with the passage of time is not observed, and it can be seen that the characteristics can be maintained.

Figure 6:
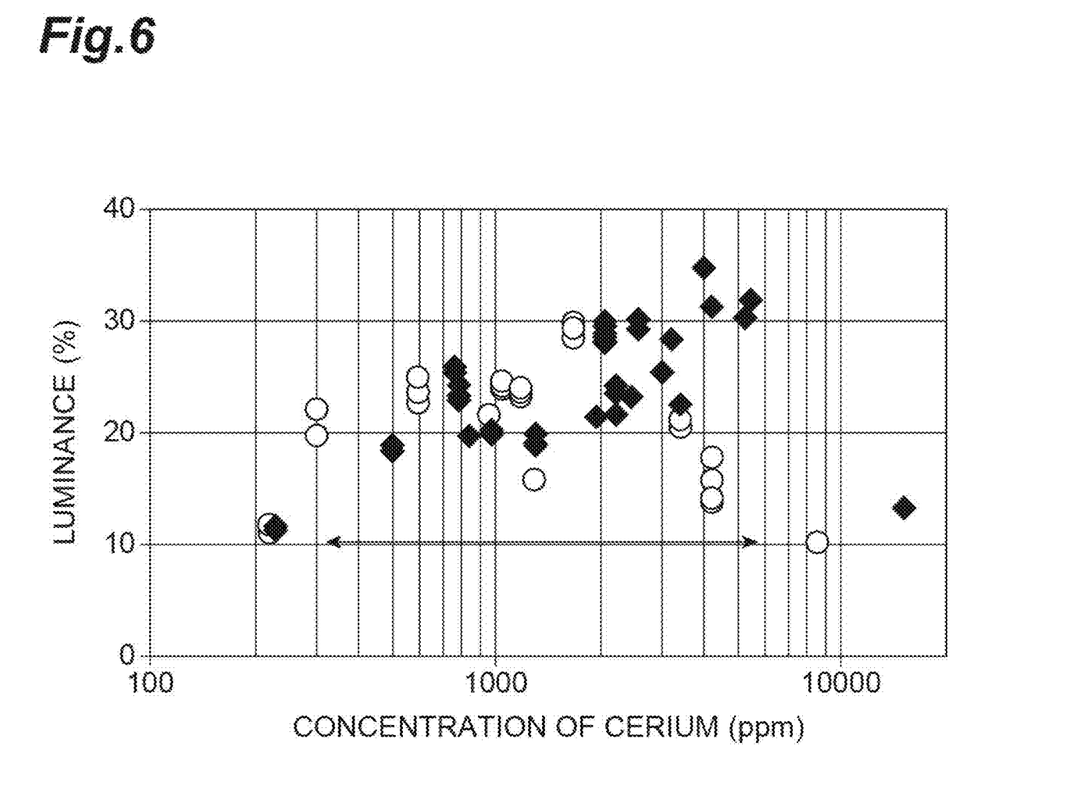
FIG. 6 is a graph showing a relationship between a concentration of cerium in the scintillator layer and luminance.

FIG. 6 is a graph showing a relationship between a concentration of the cerium in the scintillator layer 12 and luminance. In FIG. 6, the vertical axis is luminance (%) of the scintillation light, and the horizontal axis is a concentration (ppm) of the cerium in the scintillator layer 12. The luminance here is expressed as a relative value based on KODAK's Lanex regular screens. The horizontal axis is displayed on a logarithmic scale. Black rhombuses in the figure are data of the scintillator panel 10 in a state in which internal strain (residual stress) is removed by annealing. Circles "○" in the figure denote data of the scintillator panel 10 in a state in which annealing is not performed. The concentration of the cerium can be obtained by quantitative analysis of three elements, cesium, iodine and cerium.

As shown in FIG. 6, in the scintillator layer 12, such a tendency can be confirmed that the luminance increases as the concentration of the cerium increases, and the luminance decreases due to concentration quenching at a concentration not less than a certain level. It can be seen that, for example, when the concentration of the cerium in the scintillator layer 12 is 300 to 6000 ppm, scintillation light with high luminance can be generated (see the left and right arrows in the figure). It can be seen that, for example, when the concentration of the cerium in the scintillator layer 12 is 500 to 5000 ppm, scintillation light with high luminance can be further generated. It can be seen that, for example, in a case in which the scintillator panel 10 is annealed, scintillation light with higher luminance can be generated. It can be seen that, for example, in a case in which the annealing is performed, when the concentration of the cerium in the scintillator layer 12 is 500 to 6000 ppm, scintillation light with high luminance can be generated. It can be seen that, for example, in a case in which the annealing is not performed, when the concentration of the cerium in the scintillator layer 12 is 300 to 3500 ppm, scintillation light with high luminance can be generated.

Figure 7:
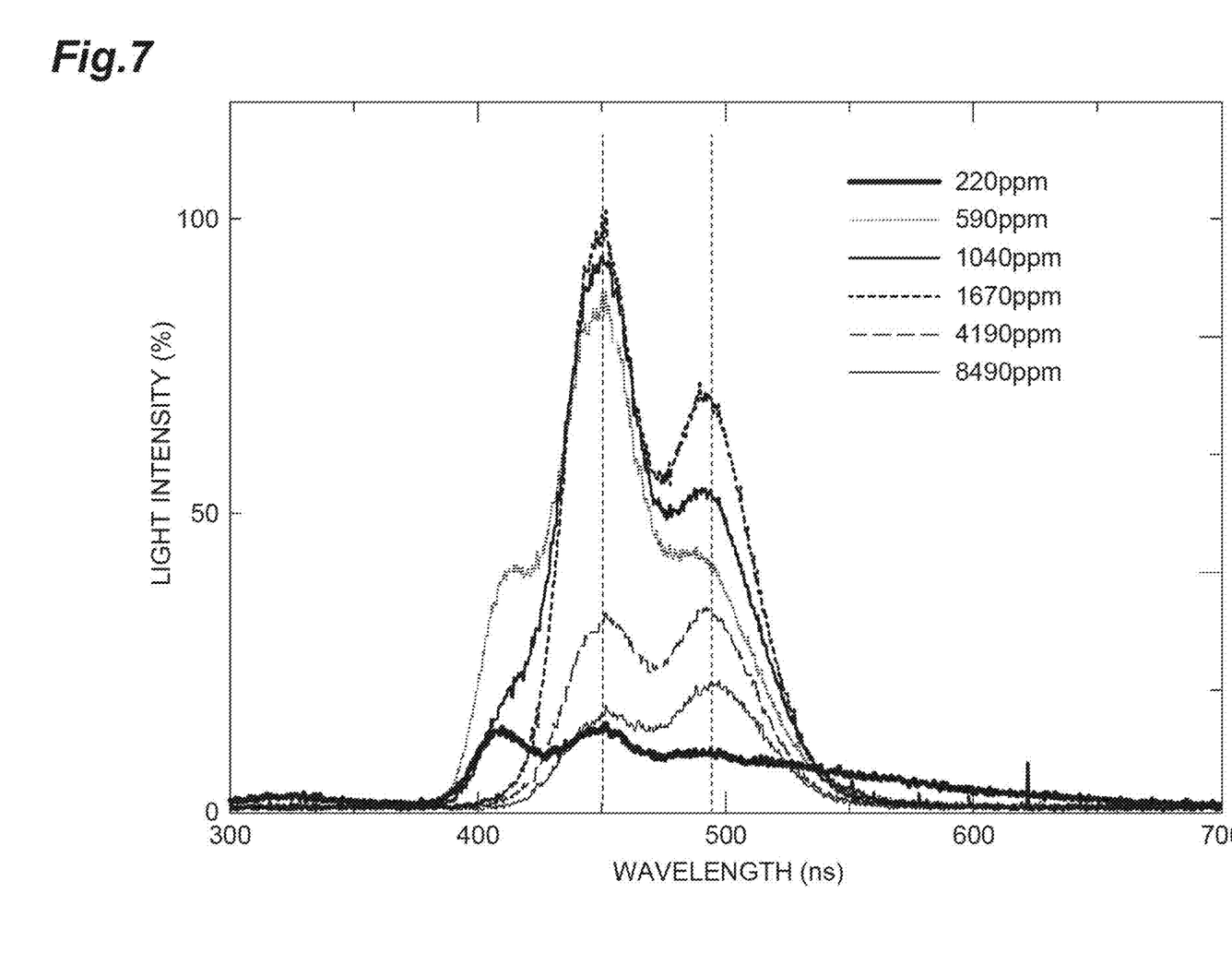
FIG. 7 is a graph showing a relationship between a concentration of cerium in the scintillator layer and emission peak luminance.

FIG. 7 is a graph showing a relationship between the concentration of the cerium in the scintillator layer 12 and emission peak luminance. The vertical axis is an intensity (%) of the scintillation light, and the horizontal axis is a wavelength (nm) of the scintillation light. In the figure, data when the concentration of the cerium in the scintillator layer 12 is 8490 ppm, 4190 ppm, 1670 ppm, 1040 ppm, 590 ppm, and 220 ppm are shown. The luminance here is expressed as a relative value with respect to the maximum value of the luminance when the concentration of the cerium in the scintillator layer 12 is 1670 ppm. As shown in FIG. 7, such a tendency can be confirmed that the intensity increases as the concentration of the cerium increases, and the intensity decreases due to concentration quenching at a concentration not less than a certain level. Further, in the scintillator layer 12, emission peaks can be confirmed when the wavelengths are 450 nm and 490 nm.

As described above, in the radiation detector 100 and the scintillator panel 10 according to the present embodiment, the scintillator layer 12 contains cesium iodide as a base material and cerium as an activator. Thus, while the general emission lifetime is on the order of microseconds, in the present embodiment, a faster emission lifetime of about 100 ns can be obtained. As a result, excellent high speed responsiveness can be obtained.

In the present embodiment, the concentration of the cerium in the scintillator layer 12 is 300 to 6000 ppm. In this case, scintillation light with high luminance can be obtained.

In the present embodiment, the emission wavelength characteristic of the scintillator layer 12 has the first emission peak at the first emission wavelength and the second emission peak at the second emission wavelength on the longer wavelength side than the first emission wavelength, and the first emission peak is larger than the second emission peak. In this case, scintillation light with high light intensity can be obtained.

In the present embodiment, the protective film 13 includes the first organic film 14, the inorganic film 15, and the second organic film 16. By forming the protective film 13 in this way, deterioration of characteristics due to deliquescence of the scintillator layer 12 can be inhibited reliably.

In the present embodiment, the inorganic film 15 has the laminated structure. In this case, deterioration of characteristics due to deliquescence of the scintillator layer 12 can be inhibited more reliably.

In the present embodiment, the support 11 is a substrate made of at least one of aluminum, glass, amorphous carbon, and polyethylene terephthalate resin. By adopting such a support 11, the scintillator panel 10 can be specifically configured.

In the present embodiment, the radiation detector 100 is a photon counting type detector. In a case in which the radiation detector 100 is a photon counting type detector, the above effect of obtaining excellent high speed responsiveness is particularly effective. For example, even in photo counting under a high dose, it is possible to inhibit pile-up of signals and perform measurement without counting.

Also, since the scintillator layer 12 are composed of columnar crystals, the radiation detector 100 and the scintillator panel 10 have excellent spatial resolution and are excellent in use for imaging applications. No correlation is found between a magnitude of the concentration of the cerium in the scintillator layer 12 and the emission lifetime.

Second Embodiment

Next, a second embodiment will be described. In the description of the second embodiment, different points from the first embodiment will be described, and repeated descriptions will be omitted.

Figure 8:
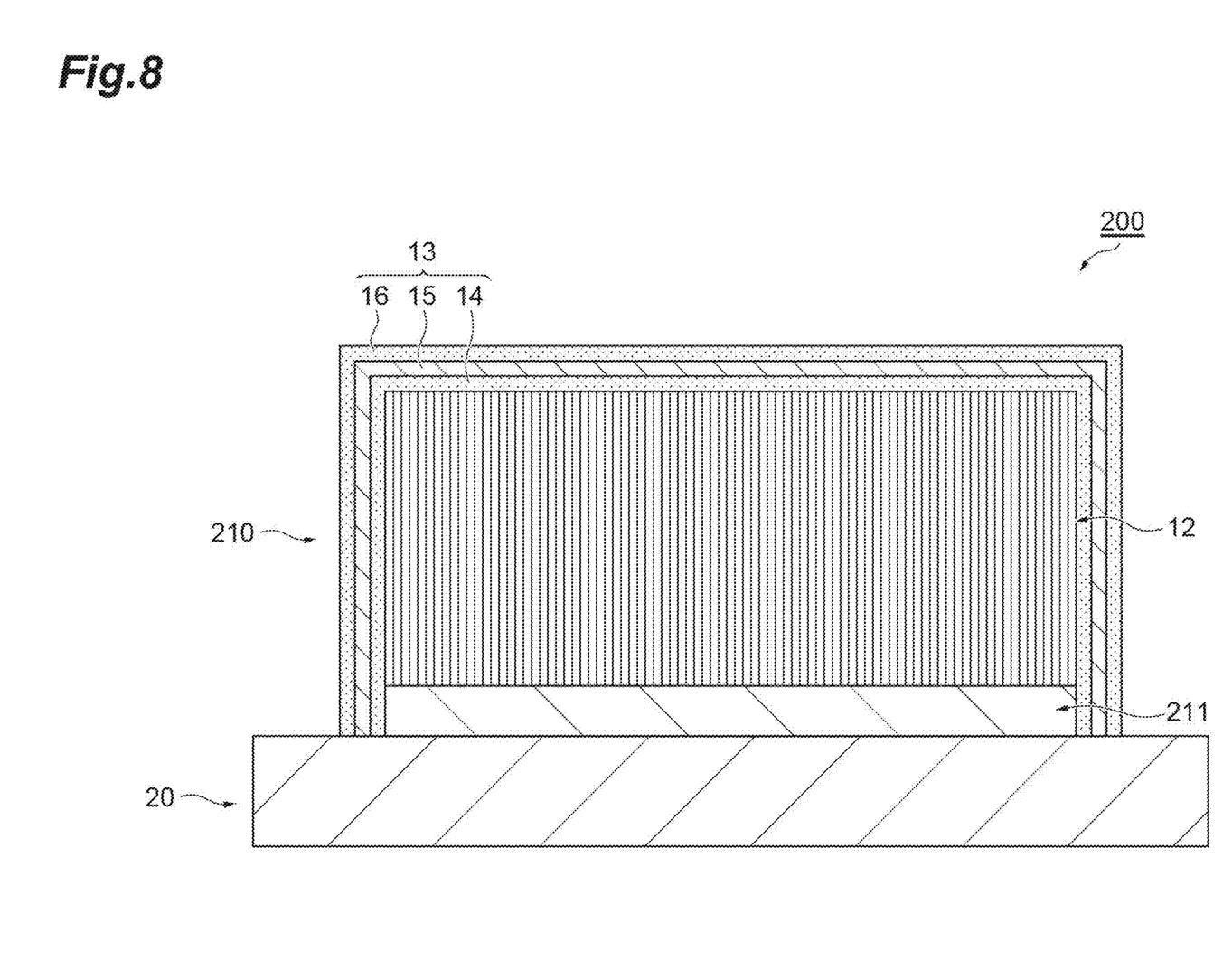
FIG. 8 is a diagram schematically showing a cross-section of a radiation detector according to a second embodiment.

As shown in FIG. 8, a radiation detector 200 of the second embodiment includes a scintillator panel 210 instead of the scintillator panel 10 (see FIG. 1). The scintillator panel 210 has a support 211 instead of the support 11 (see FIG. 1). The support 211 is a fiber optic plate. A fiber optic plate is an optical device configured by bundling a plurality of (for example, millions of) optical fibers and includes, for example, a plurality of core glasses, a clad glass covering the core glasses, and an absorber glass disposed between the plurality of core glasses. The sensor panel 20 is joined to the support 211 of the scintillator panel 210.

Even in such an embodiment, the above effects such as excellent high speed responsiveness can be obtained.

Third Embodiment

Next, a third embodiment will be described. In the description of the third embodiment, different points from the second embodiment will be described, and repeated descriptions will be omitted.

Figure 9:
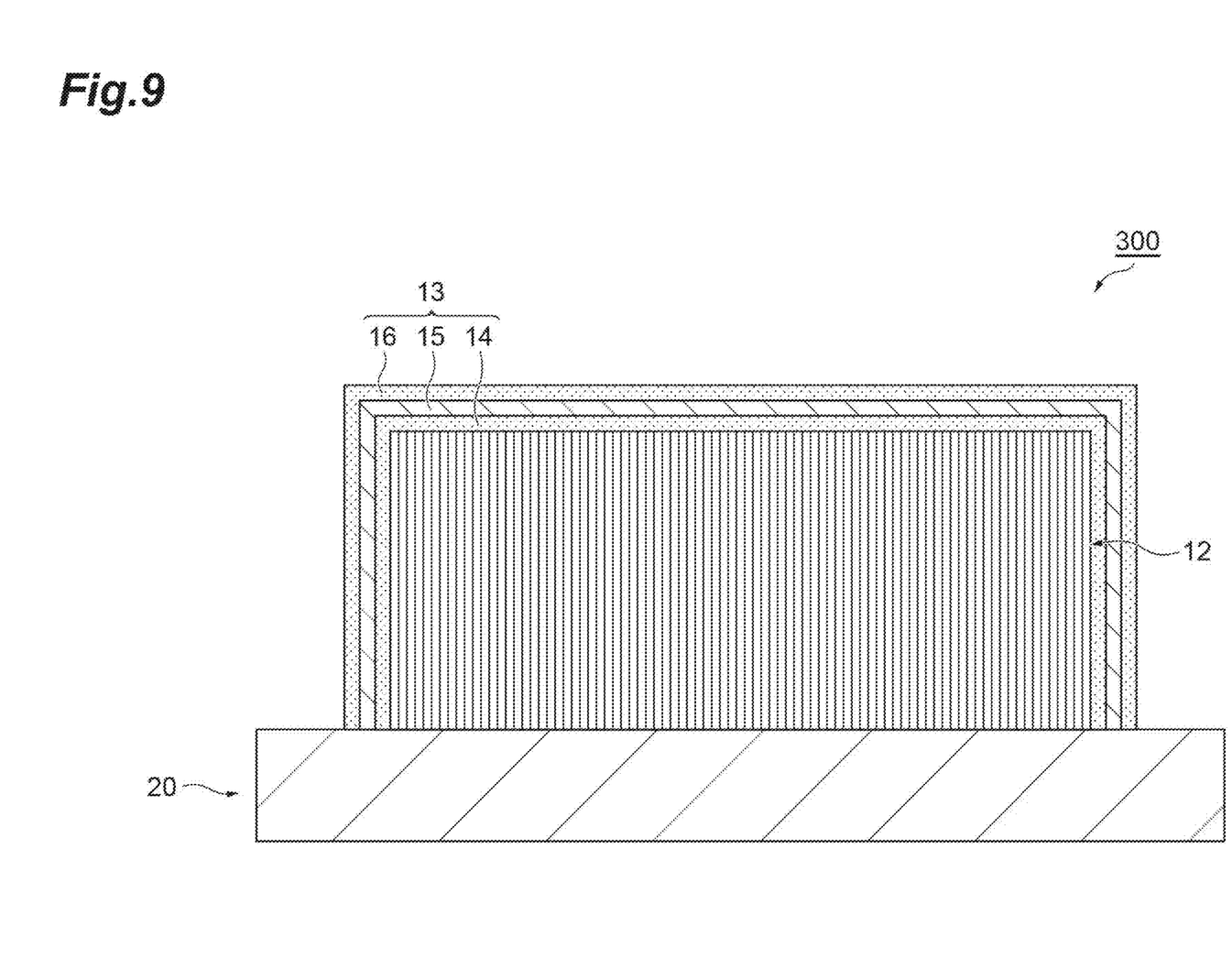
FIG. 9 is a diagram schematically showing a cross-section of a radiation detector according to a third embodiment.

As shown in FIG. 9, a radiation detector 300 of the third embodiment is different from the radiation detector 200 (see FIG. 8) in that it does not include the support 211. That is, the radiation detector 300 includes the sensor panel 20, the scintillator layer 12, and the protective film 13. The scintillator layer 12 is formed on the sensor panel 20. Specifically, the scintillator layer 12 is directly formed on a surface of the sensor panel 20. The columnar crystals of the scintillator layer 12 are arranged with their root sides on the sensor panel 20 side.

Even in such an embodiment, the above effects such as excellent high speed responsiveness can be obtained.

Modified Examples

As described above, one aspect of the present invention is not limited to the above-described embodiments.

In the above-described embodiments, the radiation detectors 100, 200, and 300 are photon counting detectors, but the present invention is not limited thereto. The radiation detectors 100, 200, and 300 may be, for example, detectors using an energy integral type collection method.

The above-mentioned embodiments and modified examples are not limited to the above-mentioned materials and shapes, and various materials and shapes can be adopted. Further, each configuration in the above-described embodiments or modified examples can be arbitrarily applied to each configuration in other embodiments or modified examples. The sensor panel 20 may be a sensor using a rigid substrate such as a glass substrate, a sensor using a flexible substrate such as a resin substrate, or the like.

REFERENCE SIGNS LIST 10, 210 Scintillator panel
11, 211 Support
12 Scintillator layer
13 Protective film
14 First organic film
15 Inorganic film
16 Second organic film
20 Sensor panel
100, 200, 300 Radiation detector
P1 First emission peak
P2 Second emission peak

The invention claimed is:

1. A scintillator panel comprising:
a support;
a scintillator layer that is a vapor deposition layer, formed on the support, and composed of a columnar crystal; and
a protective film covering at least the scintillator layer,
wherein the scintillator layer contains cesium iodide as a base material and cerium as an activator, and
wherein a concentration of the cerium is 300 to 6000 ppm.

2. The scintillator panel according to claim 1,
wherein an emission wavelength characteristic of the scintillator layer has a first emission peak at a first emission wavelength, and a second emission peak at a second emission wavelength on a longer wavelength side than the first emission wavelength, and
the first emission peak is larger than the second emission peak.

3. The scintillator panel according to claim 1, wherein the protective film includes a first organic film, an inorganic film, and a second organic film.

4. The scintillator panel according to claim 3, wherein the inorganic film has a laminated structure.

5. The scintillator panel according to claim 1, wherein the support is a substrate made of at least one of aluminum, glass, amorphous carbon, and polyethylene terephthalate resin, or a fiber optic plate.

6. A radiation detector comprising:
the scintillator panel according to claim 1; and
a sensor panel that is joined to the scintillator panel and includes a photoelectric conversion element.

7. A radiation detector comprising:
a sensor panel including a photoelectric conversion element;

a scintillator layer that is a vapor deposition layer, formed on the sensor panel, and composed of a columnar crystal; and
a protective film covering at least the scintillator layer,
wherein the scintillator layer contains cesium iodide as a base material and cerium as an activator, and
wherein a concentration of the cerium is 300 to 6000 ppm.

8. The radiation detector according to claim 7,
wherein an emission wavelength characteristic of the scintillator layer has a first emission peak at a first emission wavelength, and a second emission peak at a second emission wavelength on a longer wavelength side than the first emission wavelength, and
the first emission peak is larger than the second emission peak.

9. The radiation detector according to claim 7, wherein the protective film includes a first organic film, an inorganic film, and a second organic film.

10. The radiation detector according to claim 9, wherein the inorganic film has a laminated structure.

11. The radiation detector according to claim 6, wherein the radiation detector is a photon counting type detector.

\* \* \* \* \*